May 3, 1927.

C. ARNOLD 1,627,073

MOTOR MECHANISM FOR TOY BOATS

Filed Feb. 1, 1924

Witnesses.

Inventor:

Patented May 3, 1927.

1,627,073

UNITED STATES PATENT OFFICE.

CARL ARNOLD, OF NUREMBERG, GERMANY.

MOTOR MECHANISM FOR TOY BOATS.

Application filed February 1, 1924, Serial No. 690,092, and in Germany March 31, 1923.

The invention relates to a toy-boat of that class which is fitted with a momentum wheel driving gears and with coupling links for the transmission of the rotary motion to the propeller.

Against the already known toy-boats of a similar kind the invention bears upon the special arrangement of the driving gear parts and upon the special drive of the connecting coupling the driving gear axle with the propeller axle.

Besides the advantage of simple and consequently cheap manufacturing of toy-boats of the type this contrivance permits of using the momentum wheel of the driving gear not only as a wheel-motor but also for stabilizing whereby the equilibrium of the boat is ensured whilst by the coupling link the resistance of the propeller is neutralized so that the centrifugal power of the momentum wheel is not impaired.

For this purpose both the driving gear and the automatically disconnecting starting gear on the one hand are located in a vertical plane above the momentum wheel, this wheel being placed thus at the deepest part of the vessel, while on the other hand, the shaft of the driving gear which transmits the power is coupled with the propeller axle by means of a bow-shaped spring loop.

For the more lucid explanation of the invention it is shown in the annexed drawing.

Figure 1:
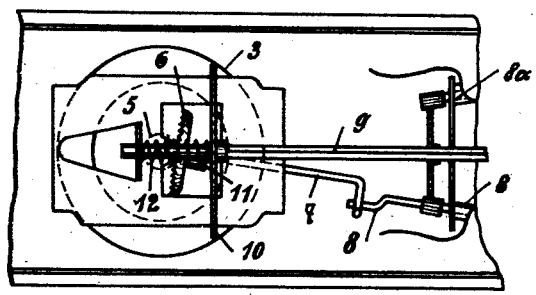
Fig. 1 shows a view from above, without the vessel's deck, of the driving gear with the usual coupling and the gear for two propellers.
Figure 2:
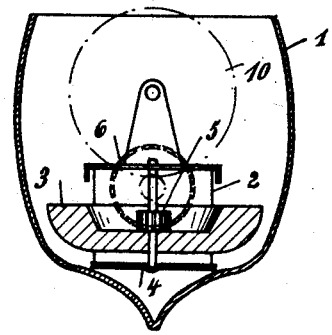
Fig. 2 shows the cross section of the vessel and of the driving gear.

According to Figs. 1 and 2 the known momentum wheel driving gear is disposed in the hull 1 on a bracket 2. This bracket 2 is bow-shaped and its arms stand on a bottom plate 4 by means of which they are fastened to the hull 1 in the usual and known way.

In the bracket 2 a vertical axle of a momentum wheel 3 is journaled and carries a toothed wheel 5, above the momentum wheel, said toothed wheel meshing with a toothed wheel 6 which is keyed on the driving gear axle 7. Vertically above this driving gear 5, 6, 7 which for the greatest part is still located within the bracket 2, the starting gear is mounted on the bracket 2. This starting gear consists of a shaft 9 which is shiftable and projects from the hull 1 and is designed to receive a key. On the shaft 9 a toothed wheel 10 is located and a spiral-spring 12 serves to permanently press the shaft in outward direction.

The toothed wheel 10 is thus brought into or out of engagement with a toothed wheel 11 on the counter axle 7. A bent arm of the axle 7 bears on a bent part of the propeller axle 8. This axle 8 serves to drive an upper axle and the propeller on the same through the intermediary of a transmission gear.

Owing to this arrangement, the one above the other, of the gearing and the starting gearing it is possible to accommodate the momentum wheel 3 on the bracket 2 at the lower end of the same and consequently at the lowest part of the hull 1, so that the momentum wheel 3 does not only serve as fly wheel motor but also as impeller for stabilizing the equilibrium of such toy-boats.

Figure 3:
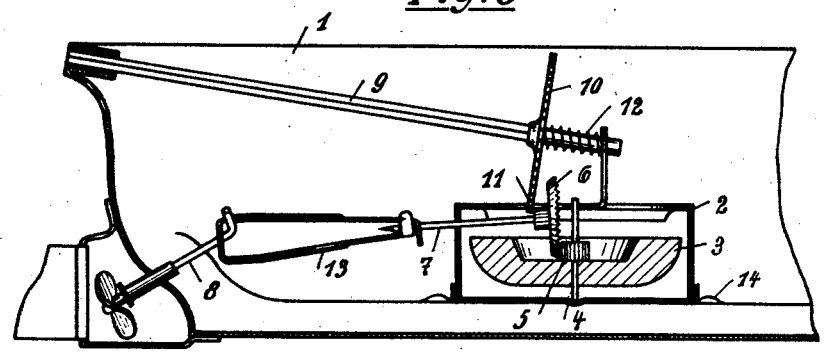
Fig. 3 shows a perpendicular longitudinal section through the vessel's hull with the driving gear in elevation and partly in section and also the new coupling link in elevation.
Figure 4:
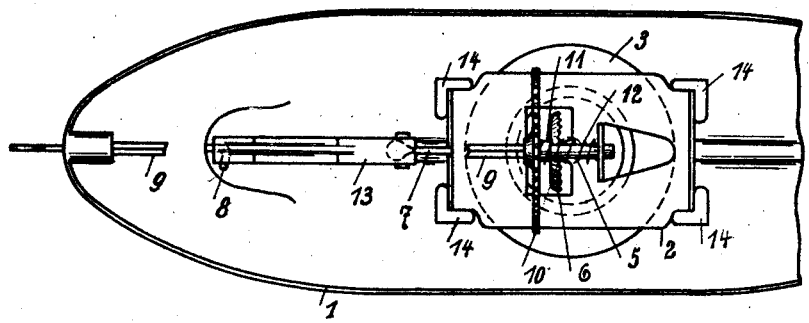
Fig. 4 shows the view from above on the vessel's hull, without the deck and on the driving gear with the partly interrupted starting gear.

According to the modification shown in Figs. 3 and 4 the axle 7 of the gearing drives the axle 8 of the propeller through the intermediary of an elastic coupling link 13 in order to overcome the resistance of the propeller and to avoid the impairing of the centrifugal power of the momentum wheel 3. With this object in view the coupling link 13 consists of a bow-shaped loop the ends of the arms of which come close together and bear both on the flattened head of the driving gear axle 7. The end of each arm has an overlapping angularly bent lateral splint designed to secure the end of the axle in its position. The bent end of axle 8 of the propeller grips over the web of loop and bears against the elastic arms of the same. Ribs obtained by pressing may be provided for reinforcing said loop.

The operation of this momentum wheel driving gear for propelling the boat is similar to that of the commonly used driving gears.

After the crank has been placed on the starting gear axle 9, in pushing said axle inwards so that the toothed wheel 10 is brought in gear with the gear wheel 11, the driving gear 5, 6 is rotated whereby the momentum wheel 3 is rotated also. From this momentum wheel 3 the propeller is driven which propels the boat. After the momentum wheel 3 has gathered sufficient momentum, the starting gear axle 9 is pushed back by the action of spring 12 so that the wheel 10 is disengaged.

I claim:—

A toy boat comprising a body, a bracket positioned on the bottom thereof, a vertical projection on said bracket, starting means comprising a shaft slidably mounted through one end of said body and through said projection, the end extending without the body adapted to receive a starting crank, a gear fixed on said shaft adjacent the projection and a spring between said gear and projection, a momentum wheel mounted in the bracket, a power imparting shaft extending laterally through the bracket, one end of said power shaft having pinion connections with said gear and said wheel, a link connection on the other end of said power shaft, said link connection cooperating with a propeller carrying shaft extending through a lower end part of the boat body to impel the boat.

CARL ARNOLD.